June 30, 1925.  L. WIGER  1,543,587
ADJUSTABLE SAW SETTING GAUGE
Filed Sept. 2, 1922
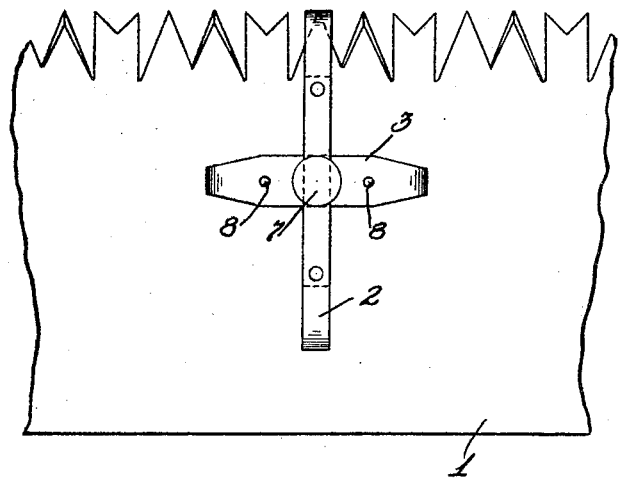
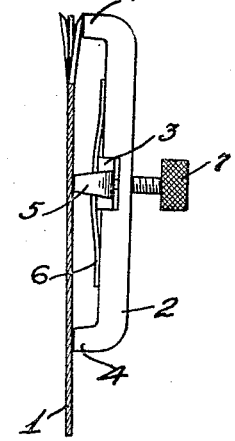
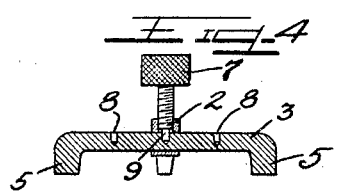
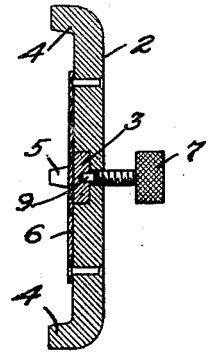

Patented June 30, 1925.

1,543,687

UNITED STATES PATENT OFFICE.

LOUIS WIGER, OF CHICAGO, ILLINOIS.

ADJUSTABLE SAW-SETTING GAUGE.

Application filed September 2, 1922. Serial No. 585,840.

*To all whom it may concern:*

Be it known that I, LOUIS WIGER, a subject of the King of Sweden, having declared my intention of becoming a citizen of the United States, and a resident of the city of Chicago, in the county of Cook and State of Illinois, have invented certain new and useful Improvements in an Adjustable Saw-Setting Gauge; and I do hereby declare that the following is a full, clear, and exact description of the same, reference being had to the accompanying drawings, and to the numerals of reference marked thereon, which form a part of this specification.

This invention relates to an improved adjustable saw setting gauge used to check the uniform setting of the teeth of saws after filing them. Heretofore, gauges have been made for this purpose, but to change the gauge, for a wide cutting saw after it was made for a narrow cut, required filing off the point of the gauge or the provision of a graduated set of gauges to cover the varied requirements of different woods, as to the set of the saw teeth. It is well known that a saw set for one condition such as ripping a soft wet or pitchy wood is unsuited for conditions verging on the other extreme, and that a saw filer must give consideration to the work the saw is expected to handle in setting each individual saw.

It is an object of this invention to provide a setting gauge that can be adjusted to any desired offset so that one gauge can be used for all saw filing jobs, thereby preventing confusion due to the multiplicity of fixed setting gauges.

It is a further object of this invention to construct a gauge so that it can be adjusted to work close up to a handle or to the end of the saw blade.

A further object of this invention is to produce a simple gauge of the fewest possible number of parts so that the gauge will be economical and easy to manufacture.

Other and further important objects of this invention will be apparent from the disclosures in the specification and the accompanying drawings.

The invention (in a preferred form) is illustrated in the drawings and hereinafter more fully described.

On the drawings:

Figure 1 is a plan view of my gauge in position on a fragment of a saw blade.

Figure 2 is a side view thereof.

Figure 3 is a section of my gauge on the vertical center line of Figure 1.

Figure 4 is a section on the horizontal center line of Figure 1.

As shown on the drawings:

The numeral 1 refers to a portion of a saw blade used to illustrate the use of my gauge. The gauge proper consists of an elongated member 2 having its ends bent to form legs 4 and recessed underneath at the center for a cross member 3 having similar legs 5. The cross member 3 is retained in the recess by a flat spring 6 secured to the member 2 in any desired manner. A knurled adjusting screw 7 is threaded through the member 2 and has a pilot 9 which engages in one of the holes 8 on the back of member 3 to prevent lateral displacement thereof. With the member 3 seated in the recess of the member 2 the four legs are so formed as to be in the same plane.

The operation is as follows:

Screwing in the adjusting screw 7 forces the member 3 partly out of the recess. The spring 6 resists this movement and keeps the member 3 seated firmly on the pilot 9 of the screw 7. Any outward movement of the member 3 brings the legs 5 out of the plane of the legs 4 so that the plane defined by the two legs 5 of the cross member 3 and one leg 4 of the longitudinal member 2 will have an adjustable clearance from the other leg 4 which determines the gauging offset to be given the saw teeth. It will be apparent that with the cross member 3 in the center of the longitudinal member 2 it is immaterial which of the legs 4 is used as the setting gauge.

When it is desired to work on the teeth close to a handle or the end of the saw the screw 7 can be retracted from the center hole 8 and the cross member moved side ways, engaging the screw pilot 9 in one of the side holes to bring one of the legs 5 close to the longitudinal member 2.

It will be apparent that setting this gauge to give any desired offset to the saw teeth is the simplest possible operation and that the gauge is particularly suited for setting a variety of saws to different offsets.

In actual use the gauge is placed on the side of the saw as in Figs. 1 and 2, and is used to determine which individual teeth require more or less offsetting to produce a smooth cutting saw. It will be evident that one gauge can handle anything from a large band saw perhaps requiring over ⅛″ offset to a jointer saw that has practically no offset.

I am aware that numerous details of construction may be varied through a wide range without departing from the principles of this invention, and I therefore do not purpose limiting the patent granted otherwise than necessitated by the prior art.

I claim as my invention:

1. In a saw setting gauge, an elongated member having a recess, a cross member provided with a series of holes and slidable in said recess, a spring adapted to yieldingly hold said cross member in said recess, and a set screw in said elongated member adapted to enter any one of said holes in said cross member and press the cross member outwardly against the action of said spring.

2. In a saw setting gauge, an elongated member having a recess and having its ends bent to form feet, a cross member provided with a series of holes slidable in said recess and having similar feet, a spring adapted to yieldingly hold said cross member in said recess, and a set screw in said elongated member adapted to enter any one of said holes in said cross member and press the cross member outwardly against the action of said spring.

3. In a saw setting gauge, an elongated member having a recess at its center, a cross member laterally slidable in the recess in said longitudinal member, a spring secured to the elongated member and passing over the cross member to retain it in the recess, and adjusting means for forcing said cross member outwardly against the action of the spring.

4. In a saw setting gauge, an elongated member having a recess at its center, a cross member laterally slidable in the recess in said elongated member, a spring secured to the elongated member and passing over the cross member to retain it in the recess, a set screw threaded in the elongated member and adapted to adjust the position of the cross member relative to the elongated member.

In testimony whereof I have hereunto subscribed my name in the presence of two subscribing witnesses.

LOUIS WIGER.

Witnesses:
CHARLES W. HILLS, Jr.,
CARLTON HILL.